(12) United States Patent
Papish

(10) Patent No.: US 10,091,552 B2
(45) Date of Patent: Oct. 2, 2018

(54) METHODS AND SYSTEMS FOR SELECTING OPTIMIZED VIEWING PORTIONS

(71) Applicant: Rovi Guides, Inc., San Jose, CA (US)

(72) Inventor: Michael Papish, Randolph Center, VT (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 13/622,887

(22) Filed: Sep. 19, 2012

(65) Prior Publication Data

US 2014/0082670 A1    Mar. 20, 2014

(51) Int. Cl.
*H04N 21/462*    (2011.01)
*H04N 21/4788*    (2011.01)
*H04N 21/482*    (2011.01)
*H04N 21/45*    (2011.01)
*H04N 21/485*    (2011.01)

(52) U.S. Cl.
CPC ....... *H04N 21/462* (2013.01); *H04N 21/4532* (2013.01); *H04N 21/4788* (2013.01); *H04N 21/482* (2013.01); *H04N 21/4858* (2013.01)

(58) Field of Classification Search
CPC ............. H04N 21/462; H04N 21/4532; H04N 21/4788; H04N 21/482; H04N 21/4858
USPC .......................................................... 725/45
See application file for complete search history.

(56) References Cited

U.S. PATENT DOCUMENTS

| 8,649,573 | B1* | 2/2014 | Darbari | G06K 9/00751 382/118 |
|---|---|---|---|---|
| 2002/0180774 | A1* | 12/2002 | Errico | G11B 27/005 715/721 |
| 2003/0034996 | A1* | 2/2003 | Li | G06F 17/30787 715/719 |
| 2003/0063798 | A1* | 4/2003 | Li | G06F 17/3061 382/165 |
| 2003/0123850 | A1* | 7/2003 | Jun | G06F 17/30796 386/343 |
| 2003/0141665 | A1* | 7/2003 | Li | G06F 17/30787 273/440.1 |
| 2003/0182620 | A1* | 9/2003 | Errico | H04N 21/23614 715/202 |
| 2005/0120368 | A1* | 6/2005 | Goronzy | G06F 17/30787 725/28 |
| 2005/0193408 | A1* | 9/2005 | Sull | G06F 17/30817 725/32 |
| 2005/0198570 | A1* | 9/2005 | Otsuka | G06F 17/30787 715/201 |
| 2005/0271269 | A1* | 12/2005 | Errico | H04N 21/23614 382/164 |

(Continued)

*Primary Examiner* — Nathan Flynn
*Assistant Examiner* — Tung T Trinh
(74) *Attorney, Agent, or Firm* — Haley Guiliano LLP

(57) ABSTRACT

Methods and systems for a media guidance application that can identify and display a portion of a media asset that is of interest to a user. In some embodiments, the media guidance application may extract a portion of the media asset that encompasses a particular main action sequence. The extracted portion may also include an amount of additional content (e.g., content immediately before or after the main action sequence) that the media guidance application determines is necessary for the user to understand the main action sequence. In some embodiments, the media guidance application may extract several media assets, so that a user may graze through the extracted portions in series.

14 Claims, 11 Drawing Sheets

(56) References Cited

U.S. PATENT DOCUMENTS

| | | | |
|---|---|---|---|
| 2006/0075454 A1* | 4/2006 | Jung | G11B 27/034 725/135 |
| 2007/0109443 A1* | 5/2007 | Barbieri | G11B 27/034 348/468 |
| 2007/0113248 A1* | 5/2007 | Hwang | G06F 17/30793 725/45 |
| 2007/0124679 A1* | 5/2007 | Jeong | G06F 17/30787 715/723 |
| 2007/0168864 A1* | 7/2007 | Yamamoto | G06F 17/30265 715/716 |
| 2007/0196076 A1* | 8/2007 | Jeong | H04N 5/775 386/291 |
| 2007/0245379 A1* | 10/2007 | Agnihortri | G06F 17/30796 725/46 |
| 2008/0250080 A1* | 10/2008 | Arrasvuori | G06F 17/30029 |
| 2009/0034932 A1* | 2/2009 | Oisel | G11B 27/034 386/248 |
| 2009/0148133 A1* | 6/2009 | Nomura | G11B 27/105 386/248 |
| 2010/0002137 A1* | 1/2010 | McKinney | G06F 17/30796 348/563 |
| 2010/0251295 A1* | 9/2010 | Amento | G11B 27/034 725/38 |
| 2012/0059825 A1* | 3/2012 | Fishman et al. | 707/737 |
| 2014/0032548 A1* | 1/2014 | Gilra | G06F 17/30038 707/736 |

\* cited by examiner

900

MEDIA ASSET DATA

902 — <MEDIA ASSET>

904 — <TITLE>BASKETBALL_GAME_TEXAS_VS_NEW_YORK</TITLE>

906 — <TYPE> SPORTS </TYPE>

908 —     <TYPE_INFO>

910 —         <DESCRIPTION_1> PRO_BBALL </DESCRIPTION_1>

912 —         <DESCRIPTION_2> MENS </DESCRIPTION_2>

914 —         <DESCRIPTION_3> NATIONAL LEAGUE </DESCRIPTION_3>

916 —     </TYPE_INFO>

918 — <SCORE>

920 —     <HOME_TEAM> 98 </HOME_TEAM>

922 —     <AWAY_TEAM> 96 </AWAY_TEAM>

924 — </SCORE>

926 — <PROGRESS>

928 —     <PLAY_LENGTH> 1:40:24 </PLAY_LENGTH>

930 —     <QUARTER> 4 </QUARTER>

932 —     <TIME_REMAINING> 10:46 </TIME_REMAINING>

934 — </PROGRESS>

936 — </MEDIA ASSET>

FIG. 9A

METHODS AND SYSTEMS FOR SELECTING OPTIMIZED VIEWING PORTIONS

BACKGROUND OF THE INVENTION

Conventional media systems allow users to access a plethora of media assets. With so many media assets available, users may have difficulty reviewing all the media assets before selecting a particular media asset to watch. Moreover, even after selecting a particular media asset a user may not have the time or the desire to view the entire play length of the media asset. Instead, a user may wish to view only a part of the media asset.

For example, while a user may be interested in a movie during an exciting action sequence, the user's interest may wane during other scenes. Alternatively, while a user may typically not enjoy the content of a particular media asset, a surprise twist or a particular segment of a television show may spark the user's interest.

Furthermore, even if a user knows that a particular media asset contains interesting segments, in order to find it, the user may be required to search throughout the play length of the media asset. The time and effort to find particular scenes may discourage the user, resulting in the user abandoning the attempt to find the interesting segment.

SUMMARY OF DISCLOSURE

Accordingly, methods and systems are disclosed herein for a media guidance application that can identify and display a portion of a media asset that is of interest to a user. In some embodiments, the media guidance application may extract a portion of the media asset that encompasses a particular main action sequence. The extracted portion may also include an amount of additional content (e.g., content immediately before or after the main action sequence) that the media guidance application determines is necessary for the user to understand the main action sequence. The extracted portion may then be displayed to a user. In some embodiments, the media guidance application may extract a portion of several media assets, so that a user may graze through the extracted portions in series.

In some embodiments, the media guidance application may receive asset information associated with the media asset. The media guidance application may then determine the genre of the media asset from the asset information. In some embodiments, asset information may include metadata associated with the media asset. After determining the genre, the media guidance application may retrieve a genre profile for the particular genre of the media asset. The genre profile may define attribute(s) of media content that are indicative of main action sequences for use in identifying a main action sequence. Once the profile genre is retrieved, the media guidance application may identify the main action sequence of the media asset based on the attribute(s) of media content found in the genre profile. The media guidance application may then extract and display a portion of the media asset, which includes the main action sequence and enough additional content to enable a user to enjoy the main action sequence.

In some embodiments, the media guidance application may adjust the length of a portion based on a user profile. For example, the user profile may indicate that a particular user may enjoy/require more or less additional content accompanying the main action sequence. In some embodiments, the media guidance application may adjust the genre profile based on a user profile. For example, the user profile may indicate that a particular user prefers/considers a different scene or segment than the genre profile to be the main action sequence. In some embodiments, the user profile may contain profile information, which supplements/replaces the attribute(s) of media content contained in a genre profile. The media guidance application may then use the modified genre profile to identify a main action sequence.

In some embodiments, the media guidance application may receive a genre indicator in the metadata associated with the media asset to determine the genre of the media asset. For example, the genre indicator may be received in a data packet(s) accompanying the media asset. In some embodiments, the media guidance application may need to process the metadata received with the media asset to determine the genre. For example, in some embodiments, the media guidance application may cross-reference genre indicator(s) received in asset information with a database featuring a look-up table of genres for which genre indicators correspond.

In some embodiments, the portion of the media asset extracted by the media guidance application may be accompanied by other portions of other media assets extracted by the media guidance application. For example, the media guidance application may enable the user to invoke a grazing mode, in which the user may view the main action sequence and additional content needed to enjoy/understand the main action sequence of several media assets. The media assets may be displayed in a list, may be browsed by the user, or may be displayed in a series.

In some embodiments, the media guidance application may use a genre profile specific to each genre. Each genre profile may contain an attribute(s) of media content, which is also specific to each genre, to identify the main action sequence of a particular media asset. The attribute(s) of media content may be compared to asset information for the media asset to identify the point of playback, scene, or segment of the media asset that constitutes the main action sequence. For example, in some embodiments (and for some genres), the main action sequence may be identified as the scene or segment of the media asset, which features the highest audio volume, the fastest edit rate, or the largest, longest, or loudest use of a laugh track. In some embodiments, the main action sequence may be identified based on a particular time during the play length of a media asset (e.g., the final twenty minutes of an action movie or television show).

In some embodiments, the main action sequence may be identified by processing metadata associated with the media asset. For example, in some embodiments, main action sequence indicators may be included accompanying the media asset. Alternatively, the media guidance application may use optical character recognition ("OCR") technology to analyze information featured on or associated with the display of the media asset (e.g., an on-screen scoreboard displayed during a baseball game). In some embodiments, the main action sequence may be identified by user-generated or third-party generated content. For example, in some embodiments, the media guidance application may process subtitles, user reviews, transcripts, or ratings to identify the main action sequence. In some embodiments, the media guidance application may monitor the content of social media networks, which discuss the media asset. For example, the content, quality, or quantity of posts, status updates, or microblogs regarding a media asset or segment of a media asset may indicate the main action sequence of the media asset.

It should be noted, the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 9A shows an exemplary data structure for data associated with a media asset, which may be used to identify a main action sequence in accordance with some embodiments of the disclosure;

DETAILED DESCRIPTION OF DRAWINGS

Figure 1:
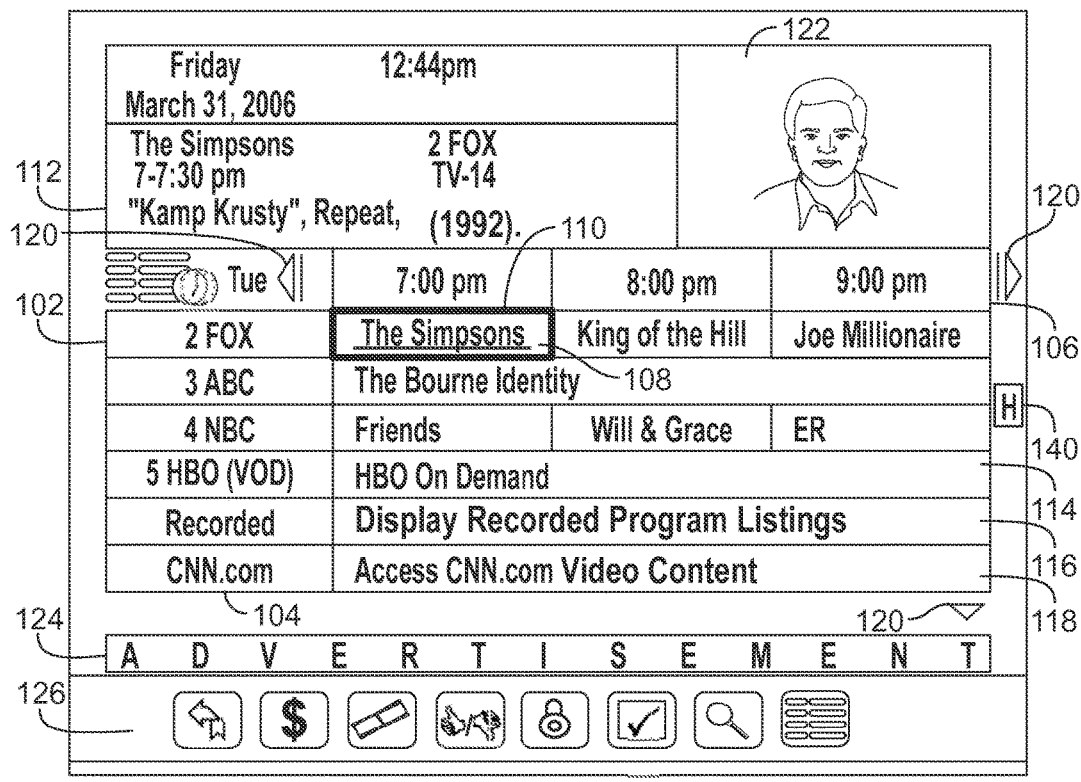
FIG. 1 shows an illustrative media guidance application that may be used to display portions of media assets in accordance with some embodiments of the disclosure.

Methods and systems are disclosed for a media guidance application that can identify and display a portion of a media asset that is of interest to a user. In some embodiments, the media guidance application may extract a portion of the media asset that encompasses a particular main action sequence. The extracted portion may also include an amount of additional content (e.g., content immediately before or after the main action sequence) that the media guidance application determines is necessary for the user to understand the main action sequence. The extracted portion may then be displayed to a user. In some embodiments, the media guidance application may extract several media assets, so that a user may graze through the extracted portions in series.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, interactive media guidance application, a media guidance application, or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among, and locate many types of, content or media assets. Interactive media guidance applications may generate graphical user interface screens that enable a user to navigate among, locate, and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

A media guidance application may also recommend or select media assets or specific portions of media assets for a user to view. In some embodiments, a media guidance application may invoke a "grazing mode," in which a user may view multiple media assets in series. Furthermore, the media guidance application may select a segment of the play length of the media asset or a particular scene of the media asset to display to the user. In some embodiments, a portion of the media asset containing the main action sequence, as selected by the media guidance application, may include any amount of the play length of the media asset, or any amount of scenes or segments from the media asset. In some embodiments, the portion may include segments of the play length of the media asset or scenes from the media asset that are not adjacent during the normal playback of the media asset. For example, in some embodiments, a portion of the media asset may include one or more sequences or scenes of interest to the user, even though the particular sequences or scenes are featured at different points in the play length of the media asset.

A portion of the media asset may include a main action sequence. As used herein, the term "main action sequence" refers to the particular scene or segment of the play length of the media asset that the media guidance application determines is of most interest to the user based on a genre profile and/or a user profile. For example, in an action movie the main action sequence may be a point in the progress of the media asset featuring a pivotal gunfight, car chase, or other action scene. For a sitcom or drama, the main action sequence may be a point in the progress of the media asset where plot points are resolved. For a mystery, the main action sequence may be a point in the progress of the media asset where the unknown elements, upon which the mystery depends, are revealed. For a comedy, the main action sequence may be a point in the progress of the media asset, in which the funniest jokes or stunts are performed. For a sports program, the main action sequence may be a point in the progress of the media asset featuring a pivotal scoring play.

As used herein, the term "genre profile" refers to a collection of one or more attributes of media content that are indicative of main action sequences. For example, in an action movie, the main action sequence may be a pivotal action scene. As such, the genre profile for an action movie may define attribute(s) of media content that are indicative of the pivotal action scenes such as a high audio level (e.g., presented during an explosion).

Each genre may include one or more genre profiles. Each genre profile may include one or more attributes. As used herein, "media content attributes" or "attributes of media content" refer to characteristics of media assets of a specific genre used by the media guidance application to determine the main action sequence of a media asset in the same genre. In some embodiments, the genre profile, and/or the attribute (s) of media content contained in the genre profile, may be modified or replaced by a user profile, or information with a user profile.

A portion may also include additional content. As used herein the term, "additional content" refers to segments of the play length of the media asset or scenes of the media asset that may relate to the main action sequence and are of interest to the user. In some embodiments, the additional content may allow the user to understand or contextualize the main action sequence (e.g., by introducing characters, rules, or important plot points). For example, in an action movie, the additional content may include segments or scenes building up to or following a pivotal gunfight, car chase, or other action scene. For a sitcom or drama, the additional content may include segments or scenes where plot points are introduced. For a mystery, the additional content may include segments or scenes that introduce the unknown elements, upon which the mystery depends. For a comedy, the additional content may include segments or scenes that set the stage or premise for the jokes or stunts. For a sports program, the additional content may include segments or scenes before a pivotal scoring play, where the game is in a competitive state.

In some embodiments, the length of a portion may be determined based on the genre of the media asset. In some embodiments, the length of the portion may depend on a user profile. For example, a user profile may indicate that a particular user may require/enjoy more or less additional content. For example, the user may be aware of particular characters or plot points in the media asset and, therefore, may not require the additional content to introduce those aspects. In some embodiments, the user profile may indicate that the user enjoys particular segments or scenes of a particular genre or media asset and, therefore, the additional content may include additional segments or scenes that are not needed to understand the main action sequence. Furthermore, in some embodiments, the additional content included in each portion may be determined by the media guidance application based on the methods and systems shown and described herein in relation to determining a main action sequence. For example, the genre profile may include an attribute(s) of media content for selecting additional content (or the points corresponding to additional content) as well as the main action sequence.

In some embodiments, the genre of a media asset may be determined by processing asset information. As used herein, a "genre" is a type or category of a media asset. In some embodiments, the genre of a media asset may be determined by the subject matter of the media asset. In some embodiments, the genre may be determined by other characteristics of the media asset (e.g., the source, the year of production, the characters, the cast and crew, the revenue generated, etc.). In some embodiments, the media asset may be characterized in multiple genres, in which multiple genre profiles may be used to determine a main action sequence in a media asset. In some embodiments, the methods and systems described herein may be applied using media content attributes associated with a criterion other than genre (e.g., based on a rating, channel, various metadata tags, release date, broadcast date, user group, etc.).

As used herein, the term "asset information" refers to data or information associated with the media asset. For example, asset information may include data transmitted with the media asset (e.g., metadata) or stored on local and/or remote equipment (e.g., guidance data). For example, asset information may include play length information, source information, content rating information, frame edits rate information, textual information, and audio and/or visual information. Asset information may also include information regarding the characters, plot, or circumstances of the media asset. For example, asset information may include particular actors, or the point in the play length of the media asset in which the actors appear, particular topics discussed at different points in the play length of the media asset, descriptions of different scenes, and the points in which they occur, during the media asset, or other information that may be used to describe the subject matter or importance of a particular scene or segment (e.g., whether a sports contest is a play-off game). Asset information may also include main action sequence indicators, which are provided by a content provider or a media guidance provider, which indicate to the media guidance application the point in the media asset constituting the main action sequence.

Asset information may also be generated by third parties. For example, in some embodiments, asset information may include user reviews, transcripts, or ratings associated with the media asset. In some embodiments, the media guidance application may monitor the content of social media networks, which discuss the media asset. For example, asset information may include content originating from posts, status updates, or microblogs on social networks regarding the media asset. In some embodiments, asset information generated by third parties may be used to identify a main action sequence. For example, a ratings spike or dramatic increase in microblog comments may indicate that the particular point, scene or segment of a media asset is of interest to users.

Asset information may be processed, or used in correlation with other information, by the media guidance application to determine the genre of a media asset. Asset information may also include genre indicators. As used herein, "genre indicators" refers to any asset information used by the media guidance application to determine the genre of a media asset. For example, genre indicators may include signals, metadata, triggers, flags, or data packets associated with the media asset that may indicate to the media guidance application that the media asset has a particular genre. In some embodiments, the media guidance application may receive the genre indicators from a content source (e.g., content source 416 (FIG. 4)), a media guidance data source (e.g., media guidance data source 418 (FIG. 4)), a user generated data source (e.g., user generated data source 424 (FIG. 4)), user equipment (e.g., user equipment 402, 404, and 406), or any other device accessible via a communications network (e.g., communications network 414 (FIG. 4)).

In some embodiments, genre indicators may include information retrieved and/or processed in the asset information. For example, by processing asset information (e.g., play length, content rating, characters, frame edit rate, rules, participants, sponsors, textual descriptions, etc.), the media guidance application may identify particular genre indicators. In some embodiments, genre indicators, whether received or identified, may be compared to an external or internal database (e.g., a look-up table featuring genre indicators and the genres to which they refer).

As used herein, a "user profile," refers to a compilation of interests of a user generated by the user and/or a third party. The media guidance application may, for example, monitor the content the user accesses and/or other interactions the user may have with the guidance application. Additionally, the media guidance application may obtain all or part of other user profiles that are related to a particular user (e.g., from other websites on the Internet the user accesses, such as www.allrovi.com, from other media guidance applications the user accesses, from other interactive applications the user accesses, from another user equipment device of the user, etc.), and/or obtain information about the user from other sources that the media guidance application may access.

In some embodiments, the attribute(s) of media content may be compared to asset information to determine a main action sequence for the media asset. In some embodiments, the attribute(s) of media content may be compared to asset information for the media asset to determine the point of playback, the scene, or the segment of the media asset that constitutes the main action sequence. For example, in some embodiments (and for some genres), the main action sequence may be identified as the scene, segment, or particular period of time of the play length of the media asset, which features the highest audio volume, the fastest frame or edit rate, the largest, longest, or loudest use of a laugh track. The media guidance application may retrieve the audio information included in the asset information of the media asset. By processing the audio information of the media asset, the media guidance application may determine the particular point of playback, scene or segment, which features the highest audio volume, fastest edit rate, or largest user of the laugh track.

In some embodiments, main action sequence may be identified based on a particular time during the play length of a media asset (e.g., the final twenty minutes of an action movie or television show). For example, in some embodiments, the media guidance application may access historical data regarding media assets of the same type to determine at what point a main action sequence typically occurs. For example, historical data for a given category (e.g., episodes of the same media asset or media assets in the same genre) of sitcoms may indicate that a high percentage of sitcoms have a main action sequence at the twenty minute mark in the play length of the media asset. Accordingly, the media guidance application may retrieve the play length information included in the asset information of the media asset to determine a main action sequence in the media asset. By processing the play length information of the media asset, the media guidance application may determine the particular point of playback, scene or segment, which corresponds to the typical point of the main action sequence in other media assets of the same genre (e.g., twenty minute mark). The media guidance application may then identify a portion, which includes this point.

In some embodiments, the media guidance application may use optical character recognition ("OCR") technology to analyze information featured on or associated with the display of the media asset (e.g., on-screen scoreboards displayed during a baseball game). For example, the media guidance application may process the display of a scoreboard shown with a media asset to determine the score or circumstances of the game. The media guidance application may also process the subtitles shown with a media asset. By processing the text (e.g., searching for keywords) of the subtitles of the media asset, the media guidance application may determine the particular point of playback, scene or segment, which features particular words, groups or words, or themes/situations indicative of a main action sequence. In some embodiments, the media guidance application may compare keywords found in the subtitles associated with a media asset to a database of subtitles that indicate a main action sequence.

In some embodiments, attributes of media content or program information may indicate several main action sequences within a single media asset. In such cases, the media guidance application may generate a media asset profile of the various main actions sequences. The media guidance application may then compare the identified main action sequences to each other or compare the identified main action sequences to a user profile to determine about which identified main action sequence the portion should be extracted. The use of a media asset profile is discussed below in relation to FIG. 8.

In some embodiments, a portion of a media asset may be displayed on user equipment. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, wireless device, or any device comprising a display screen, and/or combination of the same. The media guidance applications may be provided as on-line applications (i.e., provided on a web-site), or as stand-alone applications or clients on user equipment devices. Various devices and platforms that may implement media guidance applications are described in more detail below.

In some embodiments, in which a user is grazing media assets, the order of the media assets as appearing on a display screen of the user equipment device may change based on the occurrence of a main action sequence or the user's interest in the main action sequence of a particular media asset as determined by a user profile. For example, if the media guidance application displays a series of media assets, the positioning of the media assets in the series, with respect to one another may be altered. In some embodiments, the media guidance application may generate a predetermined order or may modify the order in real-time.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections, additional content, and/or main action sequences.

Figure 2:
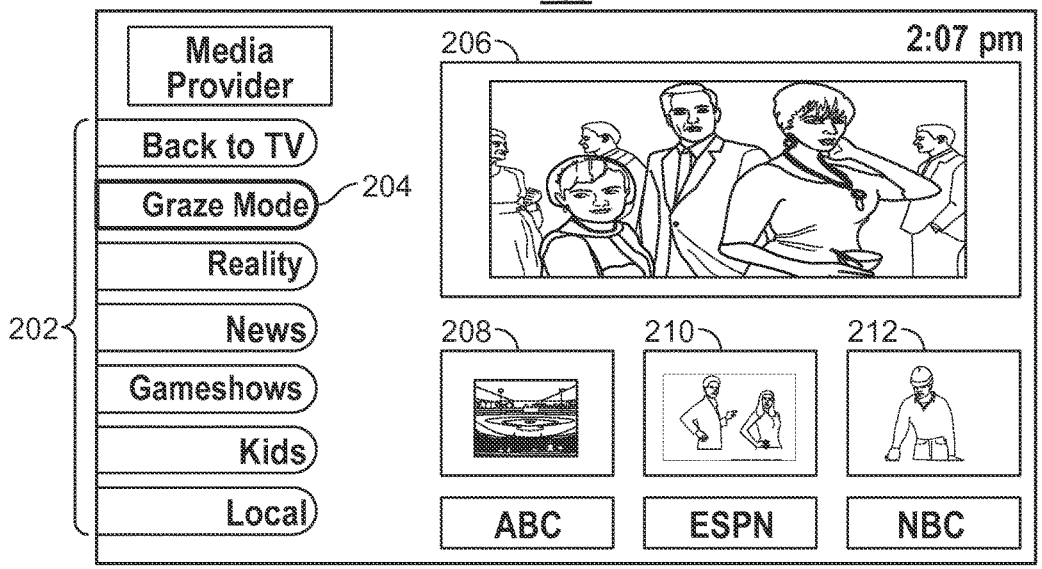
FIG. 2 shows an illustrative media guidance application that may be used to display portions of media assets in a series in accordance with some embodiments of the disclosure.

FIGS. 1-2 show illustrative display screens that may be used to provide media guidance data. The display screens shown in FIGS. 1-2, and 9C may be implemented on any suitable user equipment device or platform. While the displays of FIGS. 1-2, and 9C are illustrated as full screen displays, they may also be fully or partially overlaid over content being displayed. In addition, the displays of FIGS. 1-2, and 9C may implement mosaic displays, which display one or more video assets at any one time. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, user profile information, or data about the progression of the media content.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet website or other Internet access (e.g., FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences or a user profile. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

Another display arrangement for providing media guidance is shown in FIG. 2. Video mosaic display 200 includes selectable options 202 for content information organized based on content type, genre, and/or other organization criteria. Selectable options 202 may represent different categories or options in the video mosaic display 200. In display 200, "graze mode" option 204 is selected. Video mosaic display provides a portion of several media assets (e.g., asset 206, asset 208, asset 210, and asset 212), which may be displayed in series.

For example, during graze mode a portion, which includes the main action sequence, of asset 206, asset 208, asset 210, and asset 212 may be displayed in series (e.g., with each asset appearing in a full-screen mode) or parallel (e.g., with each asset appearing simultaneously in a mosaic display). In some embodiments, the media assets from which a portion is selected may be based on a user profile (e.g., a listing of the user's favorite shows) or may be based on a particular genre (e.g., current sports programming). In some embodiments, the media assets may include broadcasted media assets or on-demand or streamed media assets.

In some embodiments, the initial media asset displayed (whether in a full-screen mode or in a mosaic display) may automatically change to another media asset after the portion of the initial media asset is completed. For example, a user may watch several portions of different media assets in series without selecting subsequent media assets to view after the completion of previous media assets.

Figure 3:
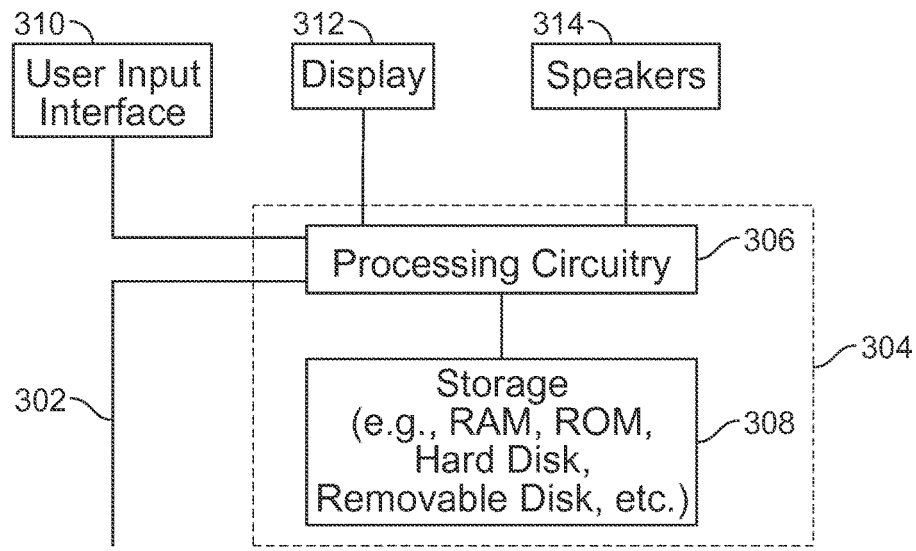
FIG. 3 is a block diagram of an illustrative user equipment device in accordance with some embodiments of the disclosure.
Figure 4:
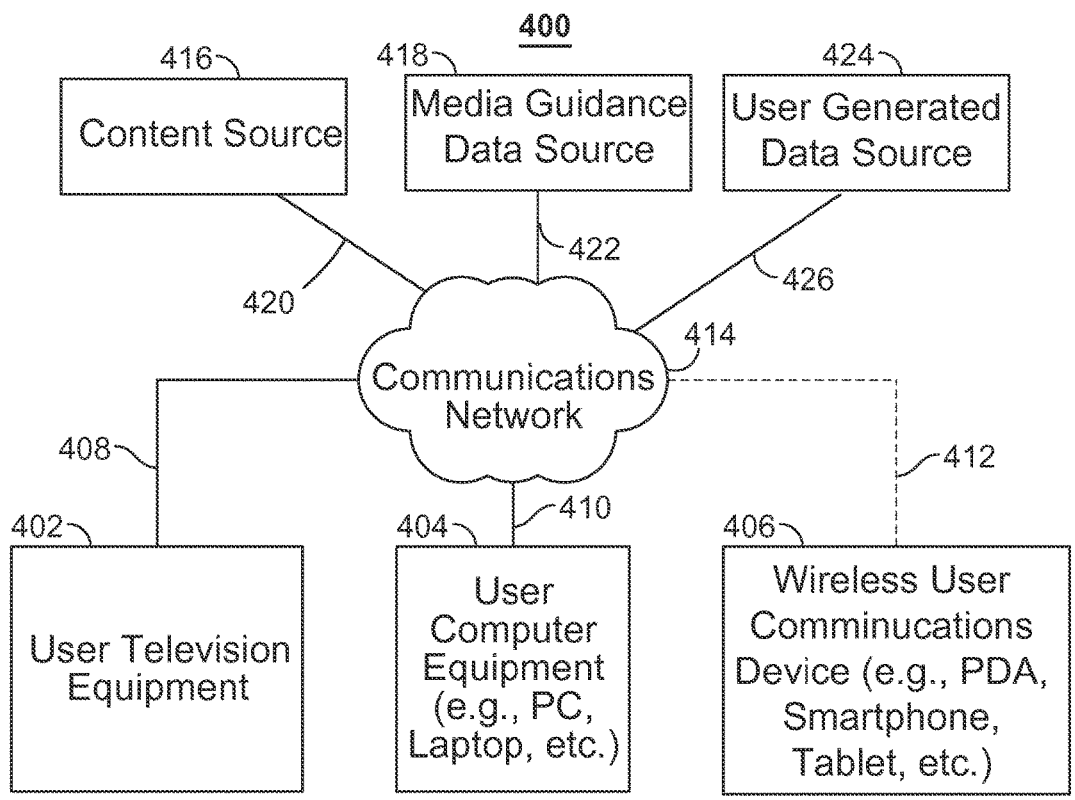
FIG. 4 is a block diagram of an illustrative media system in accordance with some embodiments of the disclosure.

In some embodiments, the media assets or portions may be selected, produced, stored, and/or displayed on any of the devices shown in FIGS. 3-4. For example, the media guidance application may be implemented on content source 416 (FIG. 4), media guidance data source 418 (FIG. 4), and/or user equipment 402, 404, and/or 406 (FIG. 4), and instruct control circuitry 304 (FIG. 3) to select particular media assets, extract a portion of the selected media assets, store the extracted portions, and displayed the extracted portions to a user on one or more of devices shown in FIGS. 3-4.

Users may access content and the media guidance application (and its display screens featuring listings described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a stand-alone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some user television equipment 402, include a tuner allowing for access to television programming, all of which may be referred to as simply user equipment. The media guidance application may have the same layout on various different types of user equipment or may be tailored to the display capabilities of the user equipment. For example, on user computer equipment 404, the guidance application may be provided as a website accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite, for example, on the website www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416, media guidance data source 418, and user generated data source 424 coupled to communications network 414 via communication paths 420, 422 and 426, respectively. Paths 420, 422 and 426 may include any of the communication paths described above in connection with paths 408, 410, and 412. Communications with the content source 416, media guidance data source 418, and user generated data source 424 may be exchanged over one or more communications paths, but are shown as a single path in FIG. 4 to avoid overcomplicating the drawing. In addition, there may be more than one of each of content source 416, media guidance data source 418, and user generated data source 424, but only one of each is shown in FIG. 4 to avoid overcomplicating the drawing. (The different types of each of these sources are discussed below.) If desired, content source 416, media guidance data source 418, and user generated data source 424 may be integrated as one source device. Although communications between sources 416, 418, and 424 with user equipment 402, 404, and 406 are shown as through communications network 414, in some embodiments, sources 416, 418, and 424 may communicate directly with user equipment 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed).

Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308 (FIG. 3), and executed by control circuitry 304 (FIG. 3) of a user equipment device 300 (FIG. 3). In some embodiments, media guidance applications may be client-server applications where only a client application resides on the user equipment device, and server application resides on a remote server.

For example, media guidance applications may be implemented partially as a client application on control circuitry 304 (FIG. 3) of user equipment device 300 (FIG. 3) and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider.

Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device. User generated data source 424 may also contain any of the characteristics or attributes of media guidance data source 428.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices.

For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, which provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record or monitor content. The user can upload content to a content storage service on the cloud either directly, for example, from user computer equipment 404 or wireless user communications device 406 having content capture feature.

Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
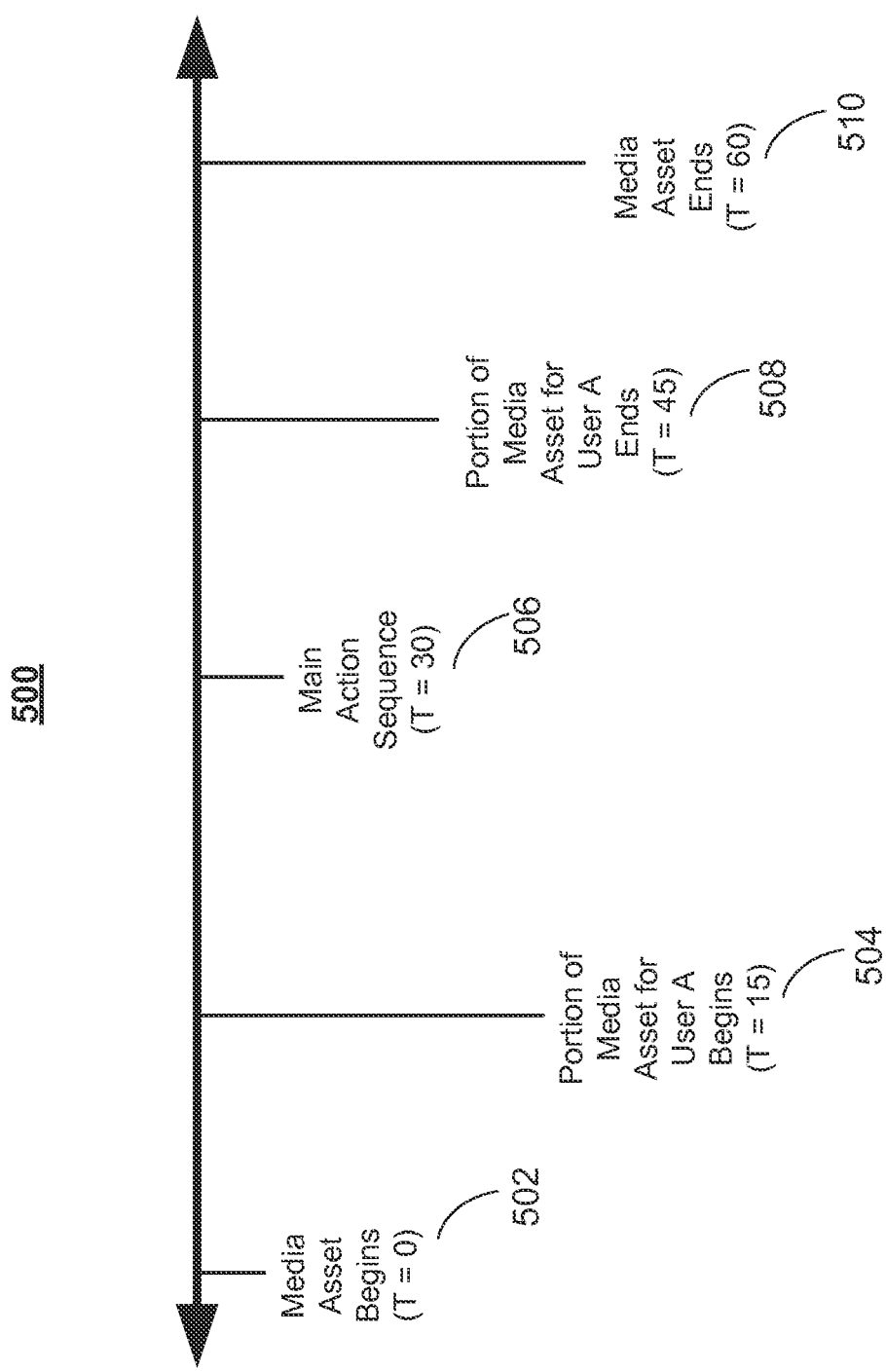
FIG. 5 shows a timeline indicating a portion of a media asset, including a main action sequence that may be created in accordance with some embodiments of the disclosure.

FIG. 5 shows a timeline indicating a portion of a media asset, including a main action sequence that may be identified in accordance with some embodiments of the disclosure. The timeline represents a portion in terms of a beginning point and end point, relative to the beginning point and end point of the media asset. The timeline may result from methods and systems disclosed herein and a portion of a media asset displaying characteristics of the timeline may be achieved using a media guidance application implemented on any of the devices shown in FIGS. 3-4. In some embodiments, the portion of the media guidance application shown and described in FIG. 5 may be the result of incorporating or combining one or more of the steps shown and described in FIGS. 6, 7, 8, 10, and/or 11.

FIG. 5 shows timeline 500, which describes an embodiment of this disclosure. At point 502 of timeline 500, a media asset begins. In some embodiments, point 502 may also correspond to the beginning of playback of the media asset or the beginning of a particular scene or segment in the media asset.

At point 504, a portion of the media asset, as determined by the media guidance application, begins. In some embodiments, the portion of the media asset may be displayed on a display (e.g., display 200 (FIG. 2)). In some embodiments, the media guidance application may also determine a different point to begin the portion based on a user profile. For example, in some embodiment (e.g., as discussed in relation to FIG. 10), the media guidance application may display a portion of the media asset based on a user profile specific to the particular user. For example, timeline 500 describes a portion beginning at point 504 for "User A"; however, a portion generated by the media guidance application for another user may begin (or end) at a different point in the media asset. Furthermore, in some embodiments, the additional content included in each portion may be determined by the media guidance application based on the methods and systems shown and described herein in relation to determining a main action sequence. For example, the genre profile may include an attribute(s) of media content defining additional content (or the points corresponding to additional content) as well as an attribute(s) of media content defining a main action sequence. For example, a genre profile for an action movie may define the main action sequence as the highest audio level in the media asset. The genre profile may also define additional content as a period of increasing audio levels that climax at the main action sequence.

At point 506, the main action sequence of the media asset begins as determined by the media guidance application (e.g., as determined by process 600 (FIG. 6)). At point 508, a portion of the media asset, as determined by the media guidance application, ends, and at point 510, the progress, segment, or scene of the media asset ends. As stated above, point 508 may be modified based on a particular user or user profile.

Figure 6:
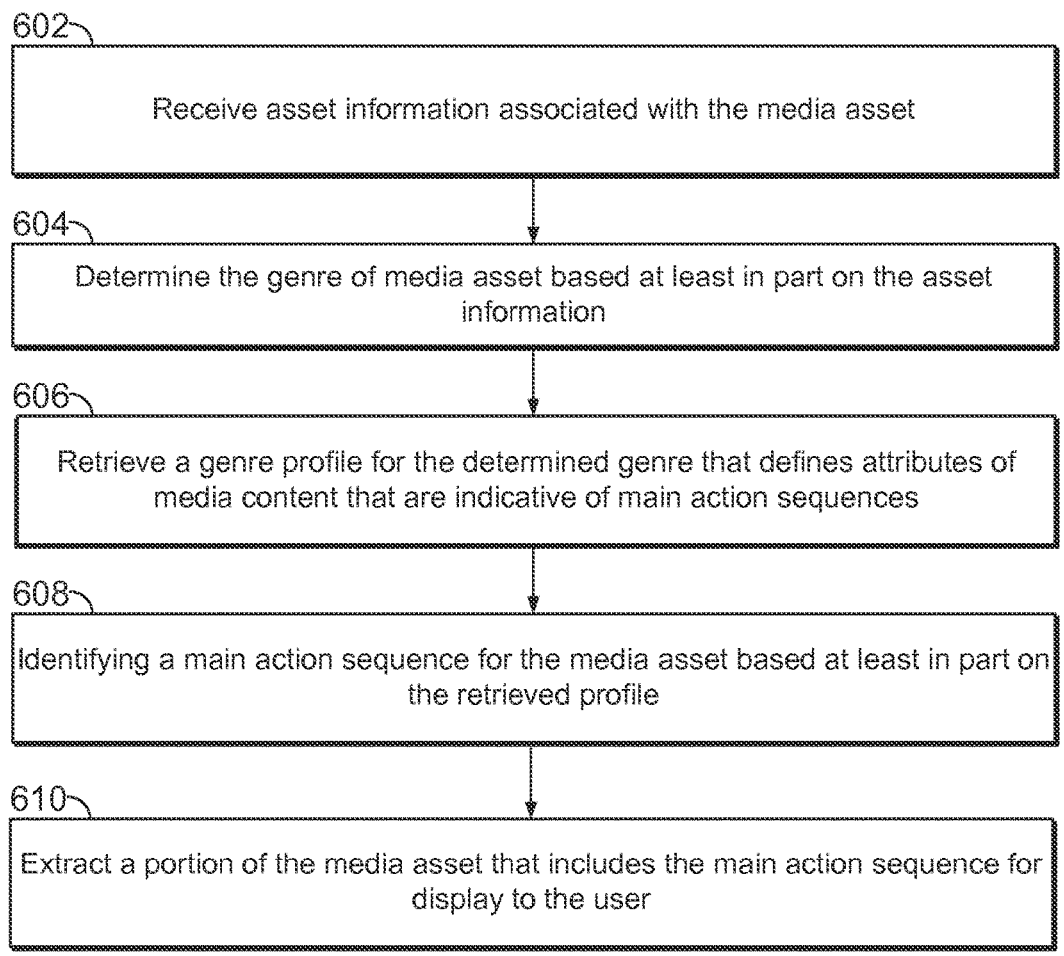
FIG. 6 is a flow-chart of illustrative steps involved in using a media guidance application to extract a portion of the media asset comprising the main action sequence in accordance with some embodiments of the disclosure.

FIG. 6 is a flow-chart of illustrative steps involved in using a media guidance application to identify a portion of the media asset comprising the main action sequence in accordance with some embodiments of the disclosure. It should be noted that process 600 or any step thereof, could be displayed on, or provided by, any of the devices shown in FIGS. 3-4. For example, process 600 may be executed by control circuitry 304 (FIG. 3) as instructed by the media guidance application. In addition, one or more steps of process 600 may be incorporated into or combined with one or more steps of any other process as described in FIGS. 7, 8, 10, and/or 11.

At step 602, the media guidance application receives asset information associated with a media asset. For example, in some embodiments, the transmission of asset information (e.g., the title, content, metadata, etc.) may be in response to the selection of the media asset, or a listing for the media asset, using the media guidance application (e.g., as shown and discussed in relation to FIGS. 1 and 2).

At step 604, the media guidance application determines the genre of the media asset based at least in part on the asset information. For example, as discussed in relation to FIGS. 7 and 8 below, the media guidance application may process data associated with the media asset to determine a particular genre of the media.

At step 606, the media guidance application retrieves a genre profile that defines attributes of media content that are indicative of main action sequences. For example, main action sequences of media assets of a particular genre may all contain similar characteristics (e.g., high audio levels). In some embodiments, the media guidance application may have multiple genre profiles. In some embodiments, the genre profile may be selected based on genre indicators received with the media asset as discussed in relation to FIG. 7. Each genre profile may have one or more attributes of media content included in the genre profile as discussed above.

At step 608, the media guidance application identifies a main action sequence of the media asset based at least in part on the retrieved profile. For example, the media guidance application may find a particular point in the progress of the media asset that matches the attribute(s) of media content. The selection of a main action sequence based on a comparison of an attribute(s) of media content and media asset information is discussed in relation to FIG. 8 below.

At step 610, the media guidance application extracts a portion of a media asset, which includes the main action sequence. For example, the media guidance application may add additional content as discussed above to create a portion of the media asset for display to the user. The additional content may contain additional play length, scenes, or segments of the media asset to promote the understanding or enjoyment of the main action sequence by the user.

It should be noted that any of the devices or equipment discussed in relation to FIGS. 3-4 could be used to perform one of more of the steps in FIG. 6. It is also contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method.

Figure 7:
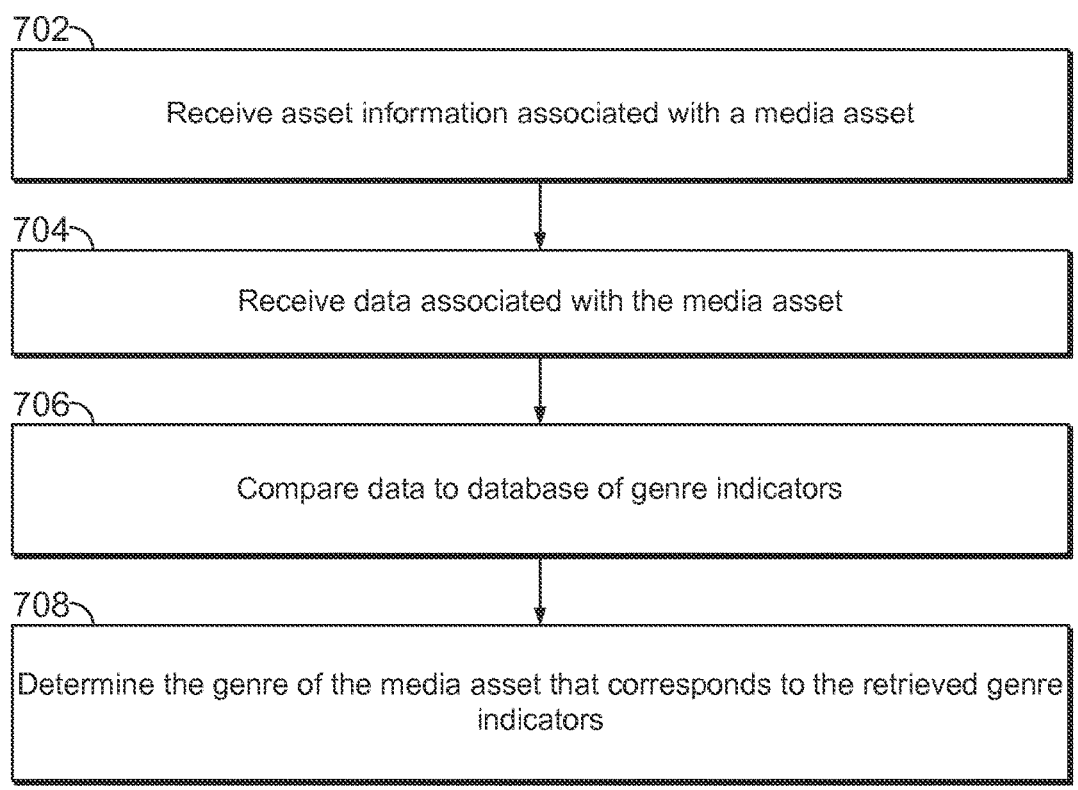
FIG. 7 is a flow-chart of illustrative steps involved in determining a genre of a media asset in accordance with some embodiments of the disclosure.

FIG. 7 is a flow-chart of illustrative steps involved in determining a genre of a media asset in accordance with some embodiments of the disclosure. A media guidance application may perform one or more steps of process 700. For example, the media guidance application may be implemented on content source 416 (FIG. 4), media guidance data source 418 (FIG. 4), user equipment 402, 404, and/or 406 (FIG. 4), and/or any device accessible via communications network 414 (FIG. 4). At step 702, the media guidance application receives asset information associated with a media asset. For example, in some embodiments, the transmission of asset information may be in response to the selection of the media asset, or a listing for the media asset, using the media guidance application (e.g., as shown and discussed in relation to FIGS. 1 and 2).

At step 704, the media guidance application receives data associated with the media asset. For example, the media asset may be accompanied by a transmission file (e.g., data structure 900 (FIG. 9)), which includes additional information associated with the media asset. At step 706, the media guidance application compares the received data to a database of genre indicators as discussed in relation to FIG. 8 below. For example, the media guidance application may receive the genre indicators in the metadata (e.g., line 906 (FIG. 9A)) associated with the media asset. The media guidance application may then compare the value associated with a particular genre indicator to values in a database of genre indicators (e.g., a look-up table, which associates particular values with particular genres).

At step 708, the media guidance application determines the genre of the media asset that corresponds to the retrieved genre indicator. For example, based on a genre associated with the particular value in a look-up table database, the media guidance application may assign the media asset a particular genre. In some embodiments, a media asset may obtain multiple genre designations.

It should be noted that any of the devices or equipment discussed in relation to FIGS. 3-4 could be used to perform one of more of the steps in FIG. 7. It is also contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. It should also be noted that genre indicators in metadata (e.g., line 906 (FIG. 9)) may be sufficient to indicate a genre without the need to process the indicator as discussed in process 700.

Figure 8:
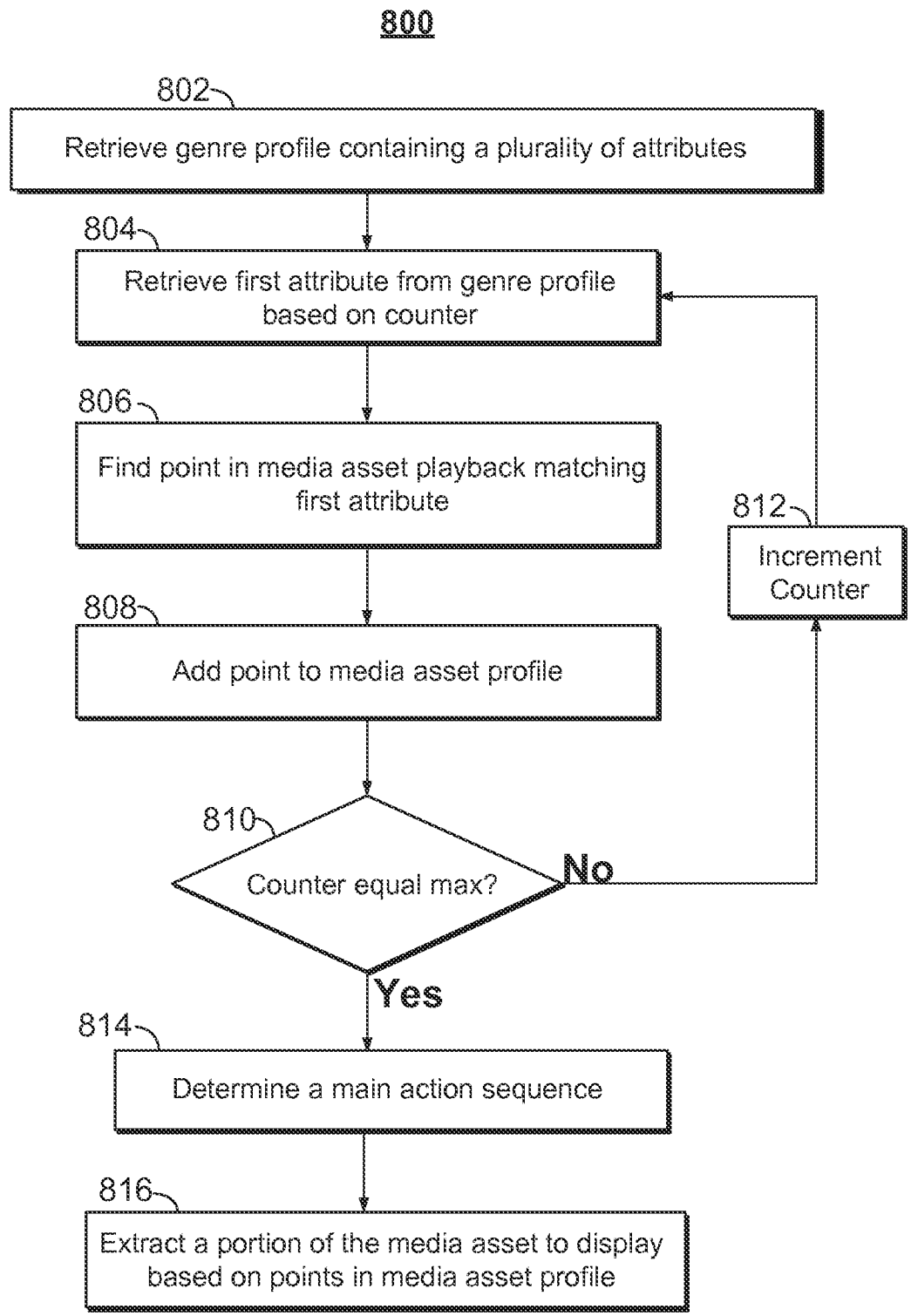
FIG. 8 is a flow-chart of illustrative steps involved in using a media guidance application to extract a portion of the media asset comprising the main action sequence based on attributes of media content contained in a genre profile in accordance with some embodiments of the disclosure.

FIG. 8 is a flowchart of illustrative steps involved in extracting a portion of the media asset to display based on selected points in a media asset profile in accordance with some embodiments of the disclosure. In some embodiments, FIG. 8 may be incorporated into, process 600 (FIG. 6). For example, process 800 may describe the method used to identify a main action sequence as described in relation to step 608 (FIG. 6). It should be noted that process 800 or any step thereof, could be displayed on, or provided by, any of the devices shown in FIGS. 3-4. For example, process 800 may be executed by control circuitry 304 (FIG. 3) as instructed by the media guidance application.

FIG. 8 shows process 800. At step 802, the media guidance application retrieves a genre profile, which may contain a plurality of attributes of media content. For example, the media guidance application may retrieve a genre profile according to the method described in relation to step 606 (FIG. 6) or process 700 (FIG. 7). At step 804, the media guidance application retrieves a first attribute of media content from the genre profile based on a counter value. For example, the genre profile may include an array of data fields, in which each data field corresponds to a particular attribute of media content. In some embodiments, the media guidance application may retrieve a value from the data field, which corresponds to the value of the attribute of media content.

At step 806, the media guidance application determines a point in the media asset playback matching the first attribute of media content. For example, the first attribute of media content may indicate that the main action sequence is a point with the highest audio volume (e.g., as discussed in relation to FIG. 9B). The media guidance application may then determine the point in the playback of the media asset with the highest audio volume. In some embodiments, the media guidance application may store the location of this point (e.g., via storing the time in the playback of the media asset at which the point occurs).

At step 808, the media guidance application inputs the data field value retrieved (e.g., the point in the media asset matching the attribute of media content) to a media asset profile. The media asset profile may be located locally at user equipment 402, 404, and/or 406 (FIG. 4) or may be located at media guidance data source 418 (FIG. 4) and accessed via the communications network 414 (FIG. 4).

At step 810, the media guidance application determines whether or not the counter value equals a maximum counter value. If the value does not equal the maximum counter value, the media guidance application will add one increment to the counter at step 812 and return to step 804. For example, if the first iteration analyzed the first data field in the array of data fields (e.g., the first attribute of media content), then the next data field analyzed may be the next data field in the array of data fields (e.g., the second attribute of media content). In some embodiments, subsequent iterations of process 800 may determine additional points in a media asset that may constitute a main action sequence.

If the counter value equals the maximum counter value at step 810, the media guidance application may output a media asset profile containing each point in the media asset that may constitute a main action sequence (e.g., each point matching an attribute of media content). For example, a particular media asset may have several points that correspond to different attributes of media content. The media guidance application may need to process the media asset profile to determine the particular point in the portion of the media asset displayed to the user.

At step 814, the media guidance application may process the media asset profile to determine the main action sequence. In some embodiments, this may involve comparing multiple points in a media asset profile (e.g., multiple points matching a particular attribute of media content) to identify which of the points constitutes the main action sequence. In some embodiments, the media guidance application may combine information regarding each of the points. For example, if several points are located within a particular time period, scene or segment of the media asset, the media guidance application may determine this time period, scene or segment to be the main action sequence. In some embodiments, the media guidance application may compare the media asset profile to a user profile to identify which point represents a main action sequence.

For example, the media asset profile may include a series of points, based on different attributes of media content, which may each potentially indicate a main action sequence. The user profile may assign a weight to each individual point in the media asset profile based on an attribute of media content that was used to identify the main action sequence. For example, the user profile may indicate that the user typically prefers the point in the media asset featuring the loudest audio volume (a first criterion) as opposed to the point featuring the most camera angle changes (a second criterion). In such cases, the point based on the first criterion would be identified as the main action sequence. In some embodiments, the media guidance application may use a combination of these methods. At step 816, the media guidance application adds additional content, based on an attribute(s) of media content discussed above or an attribute of a user profile, and extracts a portion of the media asset to display to the user (e.g., in display 200 (FIG. 2)).

It should be noted that any of the devices or equipment discussed in relation to FIGS. 3-4 could be used to perform one of more of the steps in FIG. 8. For example, the media guidance application may be implemented on content source 416 (FIG. 4), media guidance data source 418 (FIG. 4), user equipment 402, 404, and/or 406 (FIG. 4), and/or any device accessible via communications network 414 (FIG. 4). It is also contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method.

FIG. 9A shows an exemplary data structure for data transmitted with a media asset in accordance with some embodiments of the disclosure. In some embodiments, data structure 900 may include the genre indicators as discussed in relation to FIG. 7. In some embodiments, the media guidance application implemented on media guidance data source 418 (FIG. 4) or the user equipment 402, 404, and/or 406 (FIG. 4) may receive and process data structure 900 from content source 416 (FIG. 4), media guidance source 418 (FIG. 4), or user generated data source 424 (FIG. 4). For example, data structure 900 includes a plurality of lines. In some embodiments, values in the lines may be processed (e.g., in a look-up table database to determine if the values expressed in the lines correspond to a particular genre) to generate genre indicators. Alternatively, in some embodiments, the presence of a particular value or values in data structure 900 may itself be a genre indicator.

Data structure 900 includes line 902. Line 902 indicates that data structure 900 is associated with a media asset. For example, line 902 may be processed by control circuitry 304 (FIG. 3) to indicate that the received data relates to a movie. For example, data structure 900 may correspond to a movie displayed in display 200 (FIG. 2) on user equipment 402, 404, and/or 406 (FIG. 4).

Line 904 indicates the title of the media asset associated with data structure 900. In some embodiments, line 904 may itself be a genre indicator. For example, line 904 may be processed by control circuitry 304 (FIG. 3) to determine under what genre the associated media asset should be placed.

Line 906 indicates the type the media asset associated with data structure 900 is "Sports." In addition, data structure 900 includes type information as indicated by lines 908, 910, 912, 914, and 916. In some embodiments, type information may be used to determine a genre of the media asset. In some embodiments, type information may be a genre indicator. For example, the line of code associated with the type of the media asset may determine the genre of the media asset (e.g., determine the genre of the media asset associated with data structure 900 is "Sports").

Line 910 indicates that the media asset associated with data structure 900 is professional basketball. Line 912 indicates that the media asset associated with data structure 900 is men's basketball. Line 914 indicates that the media asset associated with data structure 900 is basketball played in a national basketball league. Line 916 indicates the end of the type information. It should be noted that the type information as described in FIG. 9A is not limiting, and in some embodiments, the type information as described in FIG. 9A may be replaced or supplemented by other type information as discussed in the disclosure.

In some embodiments, the media guidance application may retrieve the particular scoring system, rules, historical information, or other information relating to the media asset to determine whether or not a particular moment is a main action sequence. For example, the media guidance application may retrieve historical information associated with a media asset of this type (e.g., professional men's basketball in the national league) to determine if this particular moment is pivotal in the outcome of the game. For example, based on the information retrieved, the media guidance application may determine based on the accompanying score and progress information that the game is competitive and, therefore, this point of the media asset is more likely to be a main action sequence.

Line 918 indicates the beginning of score information in relation to the current progress of the game in the media asset associated with data structure 900. Line 920 indicates the "Home Team" has a current score of "98." Line 922 indicates the "Away Team" has a current score of "96." Line 924 indicates the end of the score information. It should be noted that the score information as described in FIG. 9A is not limiting, and in some embodiments, the score information as described in FIG. 9A may be replaced or supplemented by other score information as discussed in the disclosure.

Line 926 indicates the beginning of progress information. In some embodiments, lines 928, 930, and 932 may correspond to the point of the media asset as described in FIG. 8. Line 928 indicates the play length of the media asset. The play length may refer to the time the media asset has been televised, broadcasted, or streamed. Line 930 indicates the current quarter of the game in the media asset. Line 932 indicates the time remaining in the game time of the scored contest. Line 934 indicates the end of the progress information. In some embodiments, the information obtained in data structure 900 may be received from an external location and not received with the media asset (e.g., a location transmitting real-time information as discussed in relation to FIG. 11).

In some embodiments, data structure 900 may be processed to retrieve information which may be compared to an attribute(s) of media content as defined by a genre profile. For example, if an attribute(s) of media content indicates that the main action sequence is located at a particular point in the play length of the media asset then the media guidance application may retrieve and compare the play length information from line 928 of data structure 900. If the value of the play length information equals the value of the attribute of the media content (e.g., the particular point in the play length of media assets of the same genre, which is typically the main action sequence), the media guidance application identifies this point as the main action sequence of the media asset.

In some embodiments, based on the information retrieved, the media guidance application may determine based on the current play length, that this point of the media asset is more likely to be a main action sequence than other points in the media asset (e.g., as discussed in relation to FIG. 8). To make this determination, the media guidance application may use information suggesting that this particular genre always has a main action sequence at this particular point given the type, score, and/or progress information, or may combine this information with other data received that is associated with the media asset (e.g., determining a sports game has a close score near the end of the game may indicate the likelihood, according to a database, that this is a main action sequence). It should be noted that the progress information as described in FIG. 9A is not limiting, and in some embodiments, the progress information as described in FIG. 9A may be replaced or supplemented by other progress information as discussed in the disclosure.

Line 936 indicates end of the data transmitted with the media asset. It should be noted that the media asset information as described in FIG. 9A is not limiting, and in some embodiments, the listing information as described in FIG. 9A may be replaced or supplemented by other listing information as discussed in the disclosure. For example, line 936 may be processed by control circuitry 304 (FIG. 3) to indicate that the all data relating to the media asset was transmitted.

Figure 9B:
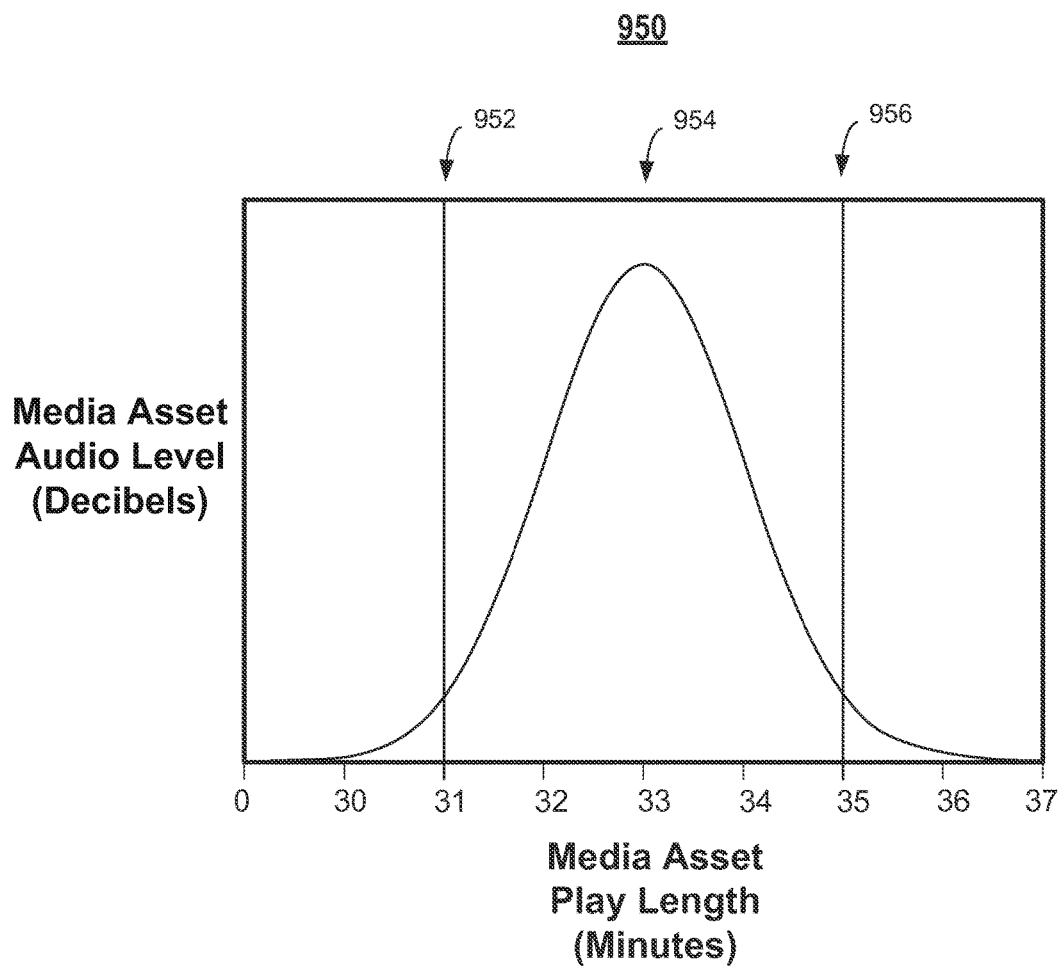
FIG. 9B shows a graph of the audio level of a media asset, which may be used to identify a main action sequence in accordance with some embodiments of the disclosure.
Figure 9C:
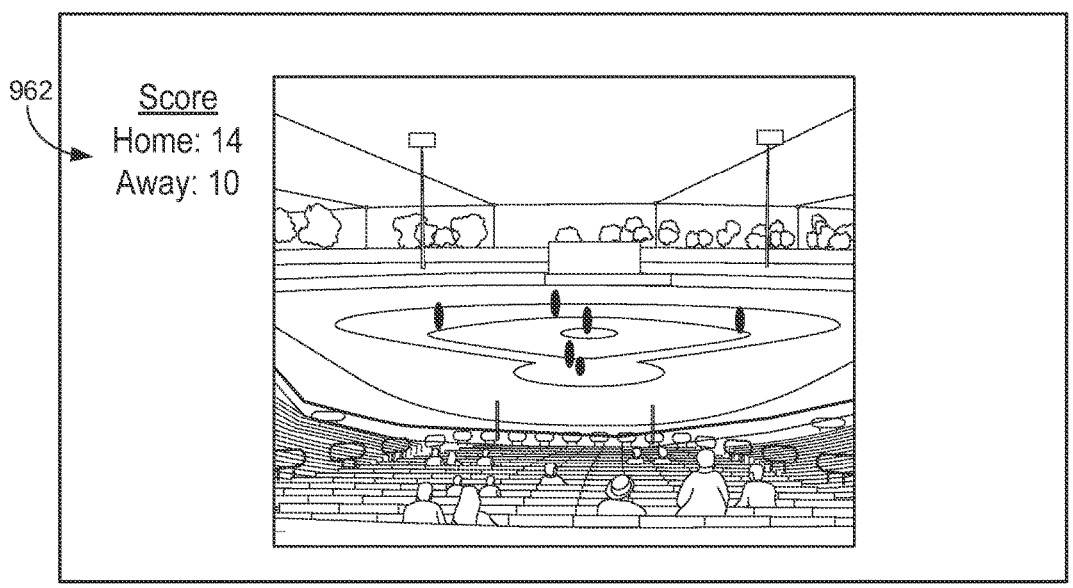
FIG. 9C shows a display of a media asset on a display screen, which may be processed using OCR technology to identify a main action sequence in accordance with some embodiments of the disclosure.

FIG. 9B shows a graph of the audio level of a media asset, which may be used to determine a main action sequence in accordance with some embodiments of the disclosure. In some embodiments, audio volume monitoring applications or other technology used to monitor the audio level of particular points during the playback of a media asset are used to identify, or combined with other information to identify, a main action sequence. For example, in some embodiments, the audio level of one point or scene in a media asset relative to other points in the media asset may be processed by control circuitry 304 (FIG. 3) to determine a main action sequence of the media asset. Characteristics of a main action sequence may include, but are not limited to, the volume level (e.g., indicating a large explosion), faster changes in audio level (e.g., indicating exciting or fast-paced music, dialogue, or action), an extended use of a laugh track (e.g., indicating amusing portions of the media asset), and/or multiple or rapidly changing pitches (e.g., indicating yells or screams).

For example, as shown by graph 950, the highest audio volume level in the media asset is at thirty-three minutes into the play length of the media asset (as represented by point 954). The media guidance application determines that point 954, the point of the highest audio level is the main action sequence (e.g., via process 800 (FIG. 8)). In some embodiments, the main action sequence may represent a climax of gradually increasing (and decreasing) volume level, relative to adjacent segments of the media asset. In some embodiments, the media guidance application may also extrapolate a beginning point and end point for the portion of the media asset, based on the audio level. For example, point 952 and point 956 represent the (relative) boundaries of the elevated volume level over the particular segment of the media asset, which includes the main action sequence. Based on these boundaries, the media guidance application sets the corresponding points in the play length of the media asset as the beginning and end points of the portion displayed to the user.

FIG. 9C shows a display of a media asset on a display screen (e.g., display 200 (FIG. 2)), which may be processed using OCR technology to determine a main action sequence in accordance with some embodiments of the disclosure. In some embodiments, OCR or other technology used to interpret images may be used to determine, or combined with other information to determine, a main action sequence. For example, in some embodiments, the media guidance application may receive information in data structure 900 (FIG. 9), which indicates the genre of the media asset is "sports." In response, the media guidance application may process the images shown on a display (e.g., display 200 (FIG. 2)) of a user device (e.g., user equipment 402, 404, or 406 (FIG. 4) to locate a box score or other information that may be used to determine a main action sequence.

For example, in FIG. 9C display 960 currently includes box score 962. The media guidance application may monitor any changes to box score 962 throughout the play length of the media asset. By analyzing the changes in box score 962, the media guidance application may determine a main action sequence for the media asset. For example, the media guidance application may compare images received with the media asset to data stored in a database (e.g., at media guidance data source 418 (FIG. 4) or any location accessible via communications network 414 (FIG. 4) to determine the particular genre, sport, or rules associated with the media asset. Based on this information (and/or information received in data structure 900 (FIG. 9A)), and any changes in box score 962, the media guidance application may determine whether or not a particular point in the media asset is a main action sequence.

In some embodiments, images associated with one point, scene, or segment of a media asset relative to other points in the media asset may be processed by control circuitry 304 (FIG. 3) to determine a main action sequence of the media asset. For example, characteristics of a main action sequence may include, but are not limited to, the language used (e.g., as determined by analyzing subtitle information), rapid camera, frame edits, or scene changes (e.g., as determined by contrasting the lighting associated with particular frames of a media asset), and/or changes in a box score or other on-screen display, as discussed above.

Figure 10:
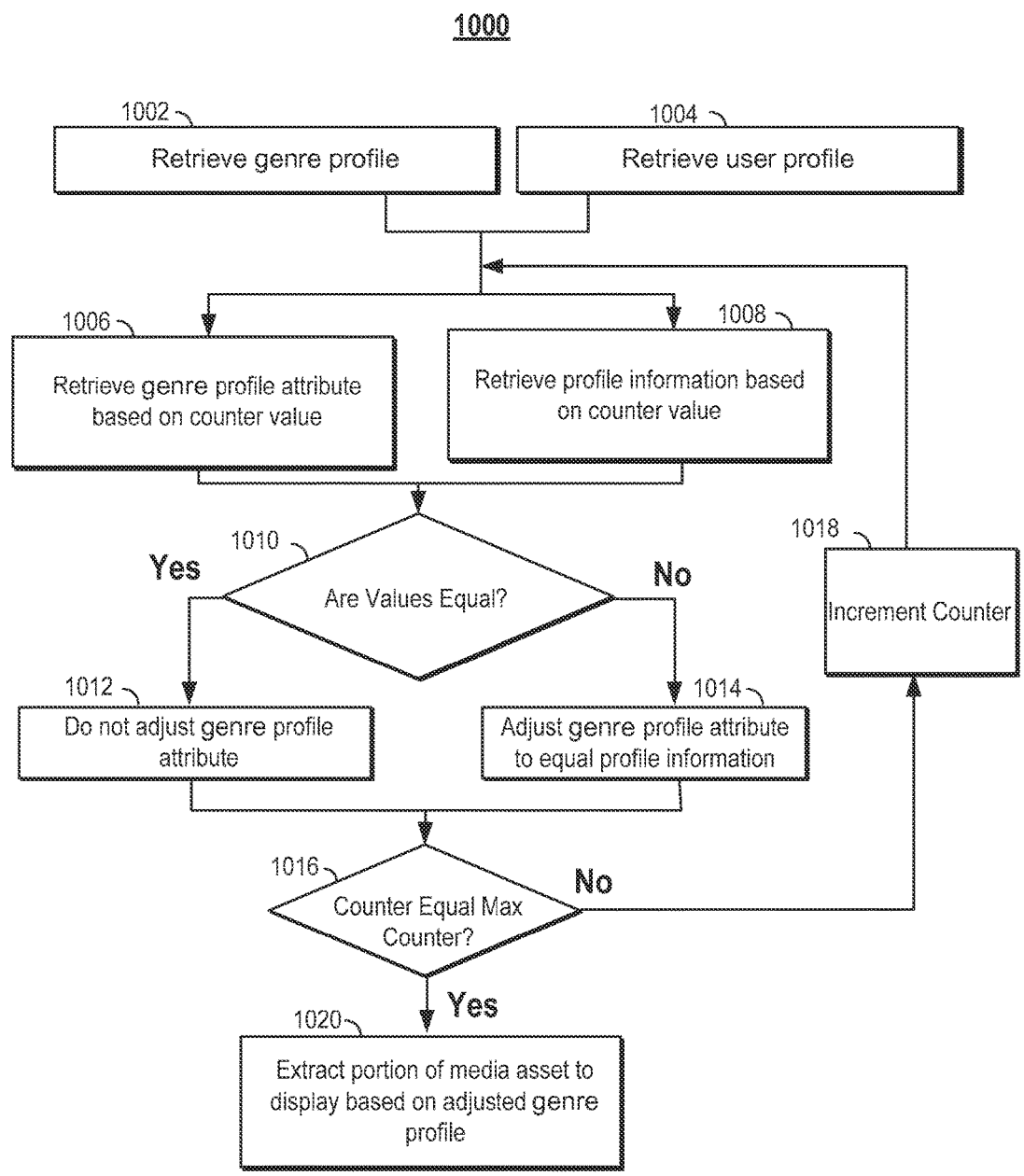
FIG. 10 is a flow-chart of illustrative steps involved in modifying a genre profile based on a user profile in accordance with some embodiments of the disclosure.

FIG. 10 is a flow-chart of illustrative steps involved in modifying a genre profile based on a user profile in accordance with some embodiments of the disclosure. Process 1000 may be performed by the media guidance application. For example, the media guidance application may be implemented on content source 416 (FIG. 4), media guidance data source 418 (FIG. 4), user equipment 402, 404, and/or 406 (FIG. 4), and/or any device accessible via communications network 414 (FIG. 4) to perform one or more steps of process 1000. Process 1000 describes determining and/or modifying a genre profile based on a user profile. For example, in some embodiments, an attribute(s) of media content included in the genre profile, may be modified based on a user profile according to particular content in the media asset that the user may regard as the main action sequence.

In some embodiments, the genre and user profiles may be structured in an array of data fields. The data fields may include textual descriptions of an attribute(s) of media content or may include values associated with specific characteristics of the media asset. The user profile may also include a plurality of data fields to describe the user. For example, the data fields may include text or values associated with specific demographics, or the values may relate to the content the particular user enjoys. In some embodiments, information about the user may also be structured in an array of data fields.

By comparing corresponding data fields for matching information, the system may determine, which points in a media asset are of interest to the particular user. For example, a movie may have a data field associated with a genre that indicates that the loudest use of the laugh track is at a particular point. Based on this information, the genre profile may determine that this point is the main action sequence. The user profile, however, may indicate the user prefers the point(s) in the media asset featuring the longest continuous use of the laugh track. Therefore, the user profile may indicate to the media guidance application to modify the genre profile, or the particular attribute of media content within the genre profile, to reflect the interest of the user.

At step 1002, the media guidance application retrieves the genre profile. In some embodiments, this may correspond to, or incorporate, one or more steps of process 700 (FIG. 7). At step 1004, the media guidance application retrieves a user profile, containing profile information. In some embodiments, the media guidance application may determine a particular user, or the particular user profile to associate with the user, via an active or passive user input as described above.

At step 1006, the media guidance application retrieves the genre profile attribute of media content based on a counter value. At step 1008, the process 1000 retrieves profile information based on the counter value. For example, the counter value may correspond to a particular row of an array. Each row of the array may indicate an attribute of media content, included in the genre profile, and corresponding profile information, included in the user profile.

At step 1010, the media guidance application compares the attribute of media content and the profile information, which may occur on content source 416 (FIG. 4), media guidance data source 418 (FIG. 4), user equipment 402, 404 and/or 406 (FIG. 4), or any device accessible via the communications network 414 (FIG. 4)).

The system may use multiple types of object recognition, including fuzzy logic. For example, the particular data field may be a textual data field. Using fuzzy logic, the system may determine two fields to be identical even though the substance of the data field (e.g., two different spellings) is not identical. In some embodiments, the system may analyze particular data fields of the genre profile attribute of media content and the profile information for particular values or text. The data fields may include values for specific interests, categories, genres, series, episodes, products, traits, ratings, targeted audiences, textual descriptions, or any other suitable values. Furthermore, the data fields may contain values (e.g., the data fields could be expressed in binary or any other suitable code or programming language).

If the value of the attribute of media content and the profile information are equal, the genre profile is not adjusted at step 1012. If the values are not equal, the media guidance application replaces the attribute of media content value with the value of the profile information at step 1014.

At step 1016, the media guidance application determines if the counter has reached its maximum value. If the counter has not reached the maximum value, the media guidance application continues to step 1018, which adds an increment to the counter, and returns to steps 1006 and 1008. If the counter has reached the maximum value, the media guidance application extracts a portion (as discussed above) of the media asset to display based on the adjusted genre profile at step 1020.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. It should be noted that any of the devices or equipment discussed in relation to FIGS. 3-4 could be used to perform one of more of the steps in FIG. 10.

Figure 11:
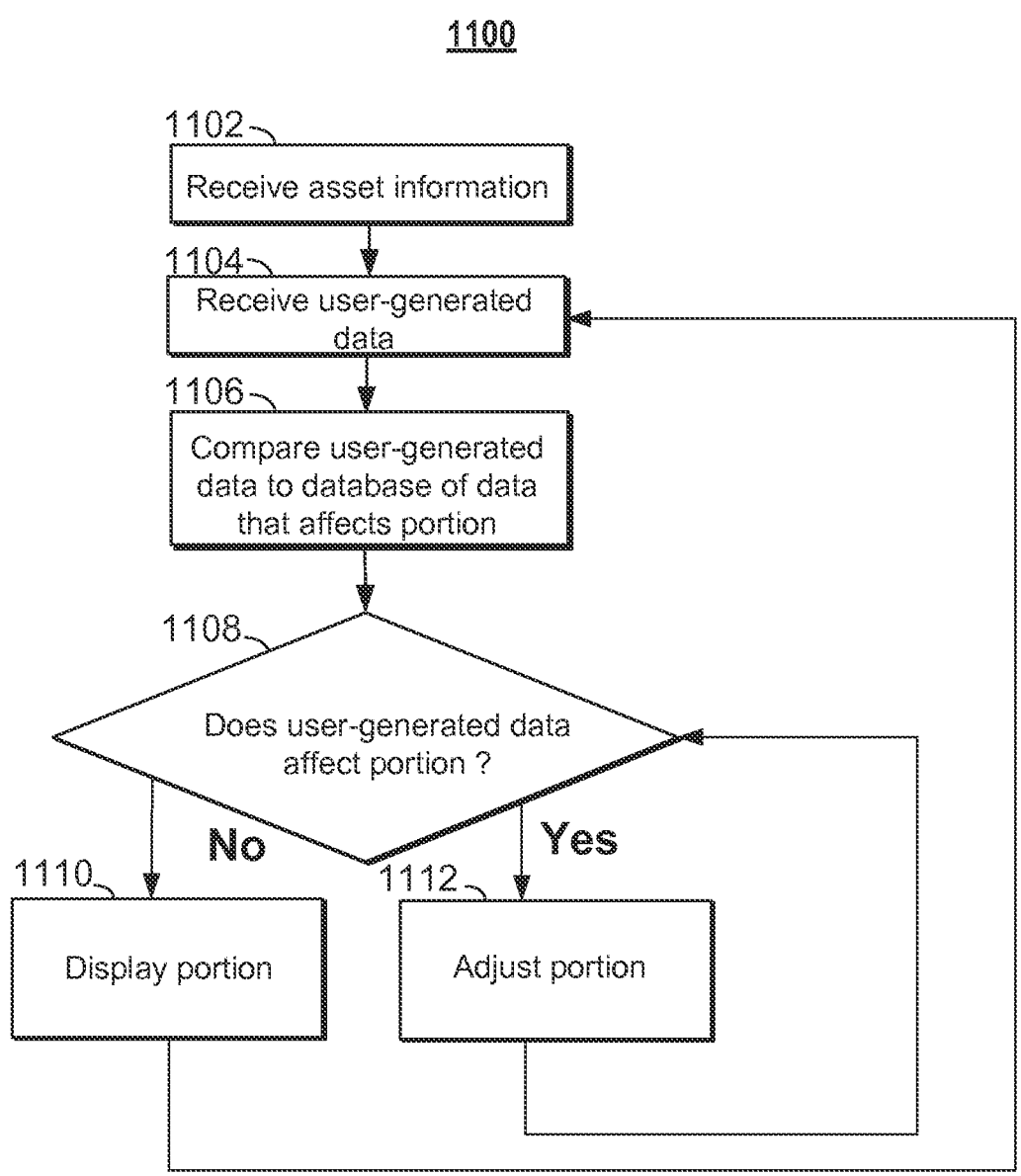
FIG. 11 is a flow-chart of illustrative steps involved in using a media guidance application to identify a portion of a media asset based on user-generated information.

FIG. 11 is a flow-chart of illustrative steps involved in using a media guidance application to determine a portion of a media asset based on user-generated information. Process 1100 may be performed by the media guidance application. For example, the media guidance application may be implemented on media guidance data source 418 (FIG. 4), user equipment 402, 404, and/or 406 (FIG. 4), and/or any device accessible via communications network 414 (FIG. 4), to perform one or more steps of process 1100. In some embodiments as discussed above the main action sequence of a media asset may be determined by processing data associated with the media asset, which is received from third parties. For example, the media guidance application may process real-time, user generated content (e.g., status updates, microblog posts, etc. regarding the media assets that are received from social media networks) regarding the media asset. The user generated content may be received by the media guidance application, which may be implemented on, or accessed from, user equipment 402, 404, or 406 (FIG. 4), from the media guidance data source 418 (FIG. 4), user generated data source 424 (FIG. 4), or another other location accessible via communications network 414 (FIG. 4).

At step 1102 of process 1100, the media guidance application receives asset information associated with the media asset. For example, the media guidance application may have received a user input via user input interface 310 (FIG. 3) indicating the user wishes to graze the media asset. In some embodiments, step 1102 may correspond to step 602 (FIG. 6). At step 1104, the media guidance application may receive user-generated data associated with the media asset. For example, the media guidance application may monitor third party ratings information for a particular point in which a spike in the ratings occurred of the original broadcast of the media asset, or monitor a real-time data feed (e.g., a microblog account on a social network associated with the media asset) for a particular point in which a spike in user generated submissions occurred. The media guidance application may use this information to determine that the point of the media asset corresponding to either spike is the main action sequence of the media asset.

At step 1106, the media guidance application compares the user-generated data to a database of user-generated data that affects the portion selected for the media asset. For example, the media guidance application may use only specific user-generated data to modify the portion. The user-generated data used may be associated with particular characteristics of the data (e.g., the reliability of the data) or may be associated with a particular source (e.g., a social network or industry source).

At step 1108, the media guidance application determines whether or not the user-generated data received in step 1104 affects the portion of the media asset. For example, a user profile may indicate that a user is part of a specific group on a social network, and that the specific group provides more accurate information regarding the interests of the user. Therefore, the media guidance application may only modify a portion based on user-generated data received from or generated by the specific group.

If the user-generated data affects the portion (or the location of the main action sequence within the portion), the media guidance application may adjust the portion at step 1112. If the user-generated data does not affect the portion, the media guidance application may display the portion (e.g., as discussed in relation to step 816 (FIG. 8)) to a user on a display (e.g., display 200 (FIG. 2)) on a user device (e.g., user equipment 402, 404, or 406 (FIG. 4)).

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one of more of the steps in FIG. 11.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted, the systems and/or methods described above may be applied to, or used in accordance with, other systems and/or methods.

What is claimed is:

1. A method for providing a media asset using a media guidance application, comprising:
   determining, using control circuitry, that a genre of the media asset is sports;
   retrieving a genre profile from memory for the sports genre that defines attributes of media content that are indicative of main action sequences, wherein the attributes of media content that are indicative of main action sequences define a listing of subtitle keywords indicative of main action sequences;
   retrieving a user profile from memory, wherein the user profile contains at least one modification for the attributes defined in the genre profile;
   modifying the attributes defined in the genre profile according to the at least one modification contained in the user profile;
   identifying the main action sequence by detecting a keyword in subtitle data associated with the media asset, which appears in the defined listing as modified;
   comparing an object present in a first image of the media asset, corresponding to a first progress point, to a corresponding object present in a second image of the media asset, corresponding to a second progress point;
   detecting a change in an alphanumeric score included in the object present in the first image based on the comparison of the object present in the first image to the corresponding object present in the second image;
   processing the change in the alphanumeric score using the attributes as modified by the at least one modifications to determine whether the change is indicative of a main action sequence;
   in response to determining that the change is indicative of the main action sequence, identifying a beginning point and an end point of a portion of the media asset based on the first and second progress points;
   receiving user-generated data related to the main action sequence, wherein the user-generated data includes data posted by a second user on a social network associated with a first user;
   adjusting the beginning point and the end point of the portion based on the user-generated data; and
   extracting the portion of the media asset for display, on a display device, to the first user.

2. The method of claim 1, further comprising identifying the main action sequence within the media asset based at least in part on profile information, wherein the profile information indicates media interests of the first user.

3. The method of claim 1, further comprising adjusting the beginning point and the end point of the portion based at least in part on a user profile, wherein the user profile includes a user preference for additional content surrounding the main action sequence.

4. The method of claim 1, further comprising receiving asset information associated with the media asset, wherein the asset information indicates the genre.

5. The method of claim 1, further comprising generating for display the portion of the media asset in series with a plurality of portions of media assets, wherein each of the plurality of portions comprises a respective main action sequence of the corresponding media asset.

6. The method of claim 1, wherein the attributes of media content that are indicative of main action sequences define an audio level indicative of main action sequences, and further comprising identifying the main action sequence in the media element by locating a point the media asset corresponding to the defined audio level.

7. The method of claim 1, wherein the attributes of media content that are indicative of main action sequences define points typically associated with main action sequences in media assets having a same genre as the media asset, and further comprising identifying the main action sequence in the media element by identifying a point in a play length of the media asset corresponding to the defined points.

8. A system for providing a media asset using a media guidance application, comprising:
   control circuitry configured to:
      determine, based at least in part on the asset information, that a genre of the media asset is sports;
      retrieve a genre profile for the sports genre that defines attributes of media content that are indicative of main action sequences, wherein the attributes of media content that are indicative of main action sequences define a listing of subtitle keywords indicative of main action sequences;
      retrieve a user profile from memory, wherein the user profile contains at least one modification for the attributes defined in the genre profile;
      modify the attributes defined in the genre profile according to the at least one modification contained in the user profile;
      identify the main action sequence by detecting a keyword in subtitle data associated with the media asset, which appears in the defined listing as modified;
      compare an object present in a first image of the media asset, corresponding to a first progress point, to a corresponding object present in a second image of the media asset, corresponding to a second progress point;
      detect a change in an alphanumeric score included in the object present in the first image based on the comparison of the object present in the first image to the corresponding object present in the second image;
      process the change in the alphanumeric score using the attributes as modified by the at least one modifications to determine whether the change is indicative of a main action sequence;
      in response to determining that the change is indicative of the main action sequence, identify a beginning point and an end point of a portion of the media asset based on the first and second progress points;
      receive user-generated data related to the main action sequence, wherein the user-generated data includes data posted by a second user on a social network associated with a first user;

adjust the beginning point and the end point of the portion based on the user-generated data; and extract the portion of the media asset for display to the first user.

9. The system of claim 8, wherein the control circuitry is further configured to identify the main action sequence within the media asset based at least in part on profile information, wherein the profile information indicate media interests of the first user.

10. The system of claim 8, wherein the control circuitry is further configured to adjust the beginning point and the end point of the portion based at least in part on a user profile, wherein the user profile includes a user preference for additional content surrounding the main action sequence.

11. The system of claim 8, further comprising receiving asset information associated with the media asset, wherein the asset information indicates the genre.

12. The system of claim 8, wherein the control circuitry is further configured to generate for display the portion of the media asset in series with a plurality of portions of media assets, wherein each of the plurality of portions comprises a respective main action sequence of the corresponding media asset.

13. The system of claim 8, wherein the attributes of media content that are indicative of main action sequences define an audio level indicative of main action sequences, and wherein the control circuitry is further configured to identify the main action sequence in the media element by locating a point the media asset corresponding to the defined audio level.

14. The system of claim 8, wherein the attributes of media content that are indicative of main action sequences define points typically associated with main action sequences in media assets having a same genre as the media asset, and wherein the control circuitry is further configured to identify the main action sequence in the media element by identifying a point in a play length of the media asset corresponding to the defined points.

* * * * *